(No Model.)  5 Sheets—Sheet 1.
H. BLAND.
SHEEP SHEARING MACHINE.
No. 509,837.  Patented Nov. 28, 1893.
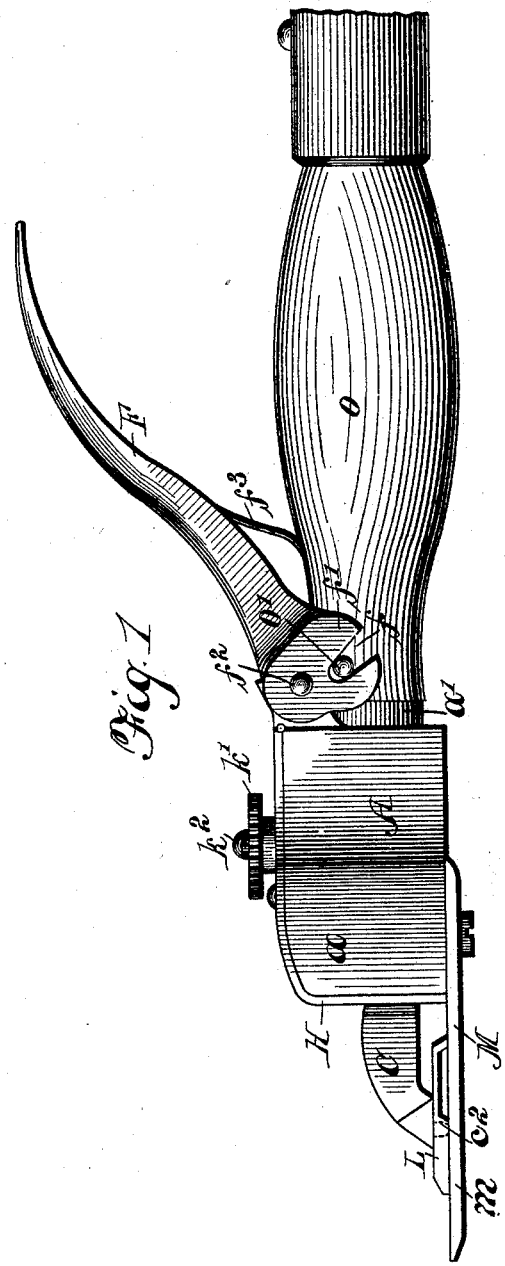
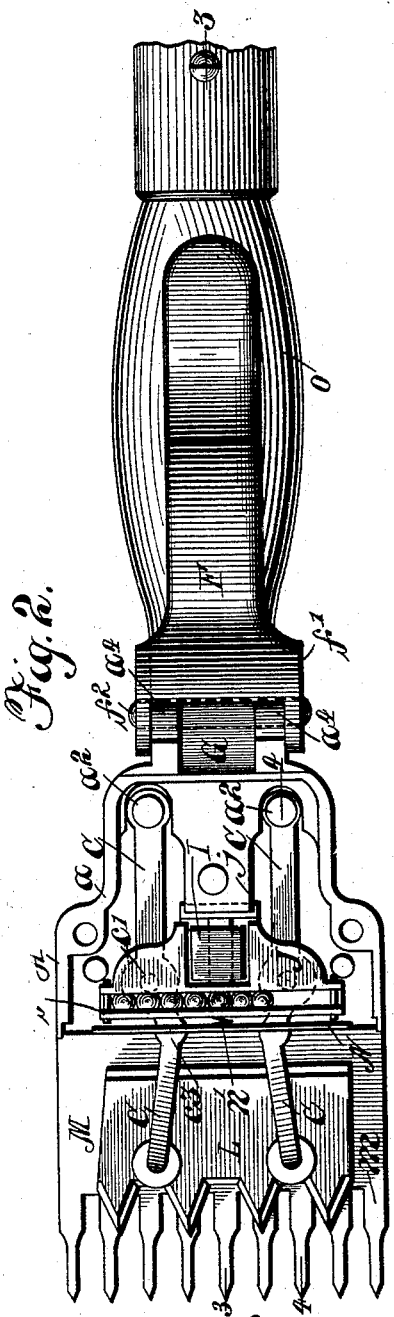
Witnesses:
H. T. Dieterich
B. W. Sommers
Inventor:
Henry Bland.
By Henry Orth
Atty.

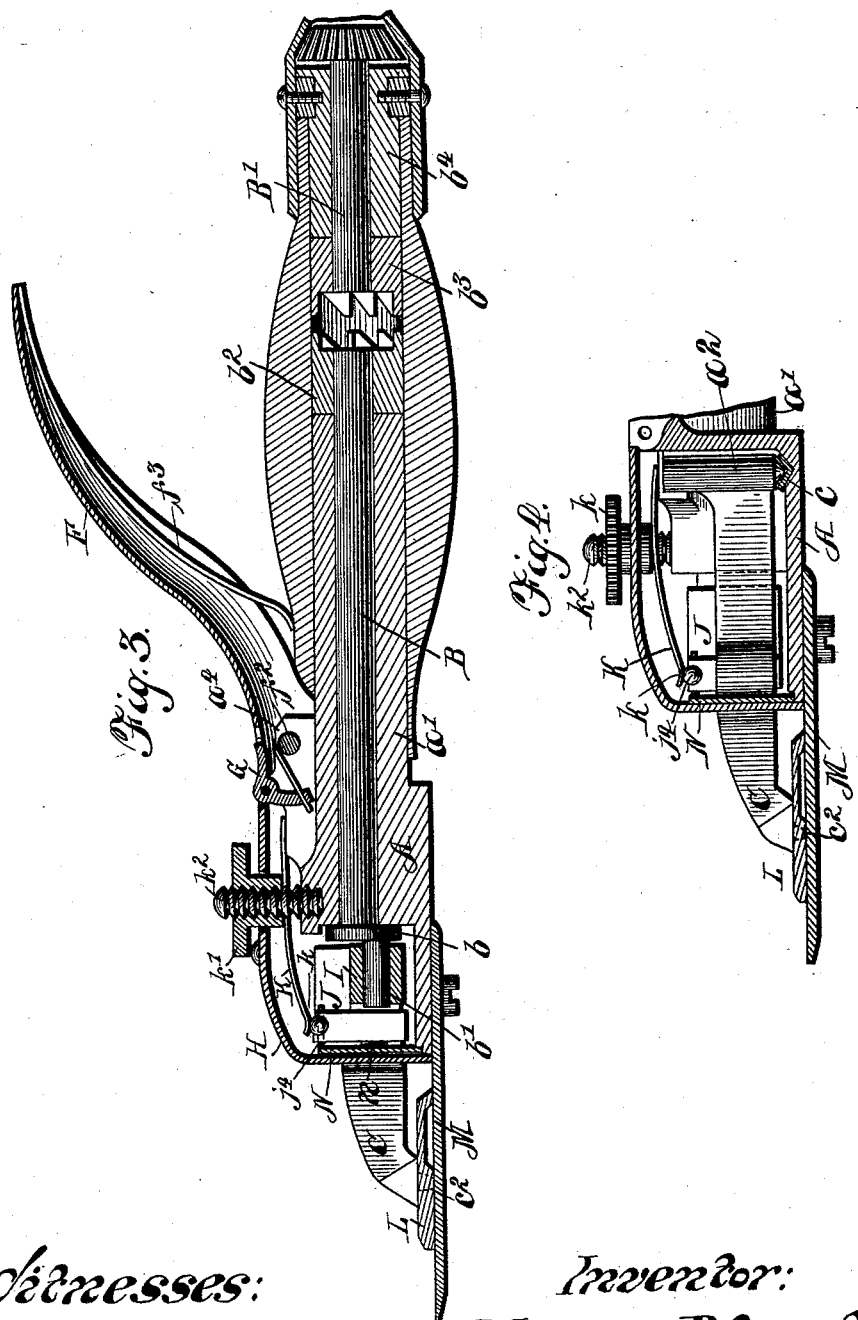

(No Model.) 5 Sheets—Sheet 3.

H. BLAND.
SHEEP SHEARING MACHINE.

No. 509,837. Patented Nov. 28, 1893.

Witnesses:
H. T. Dieterich
B. W. Sommers

Inventor
Henry Bland
By [signature] Atty

THE NATIONAL LITHOGRAPHING COMPANY,
WASHINGTON, D. C.

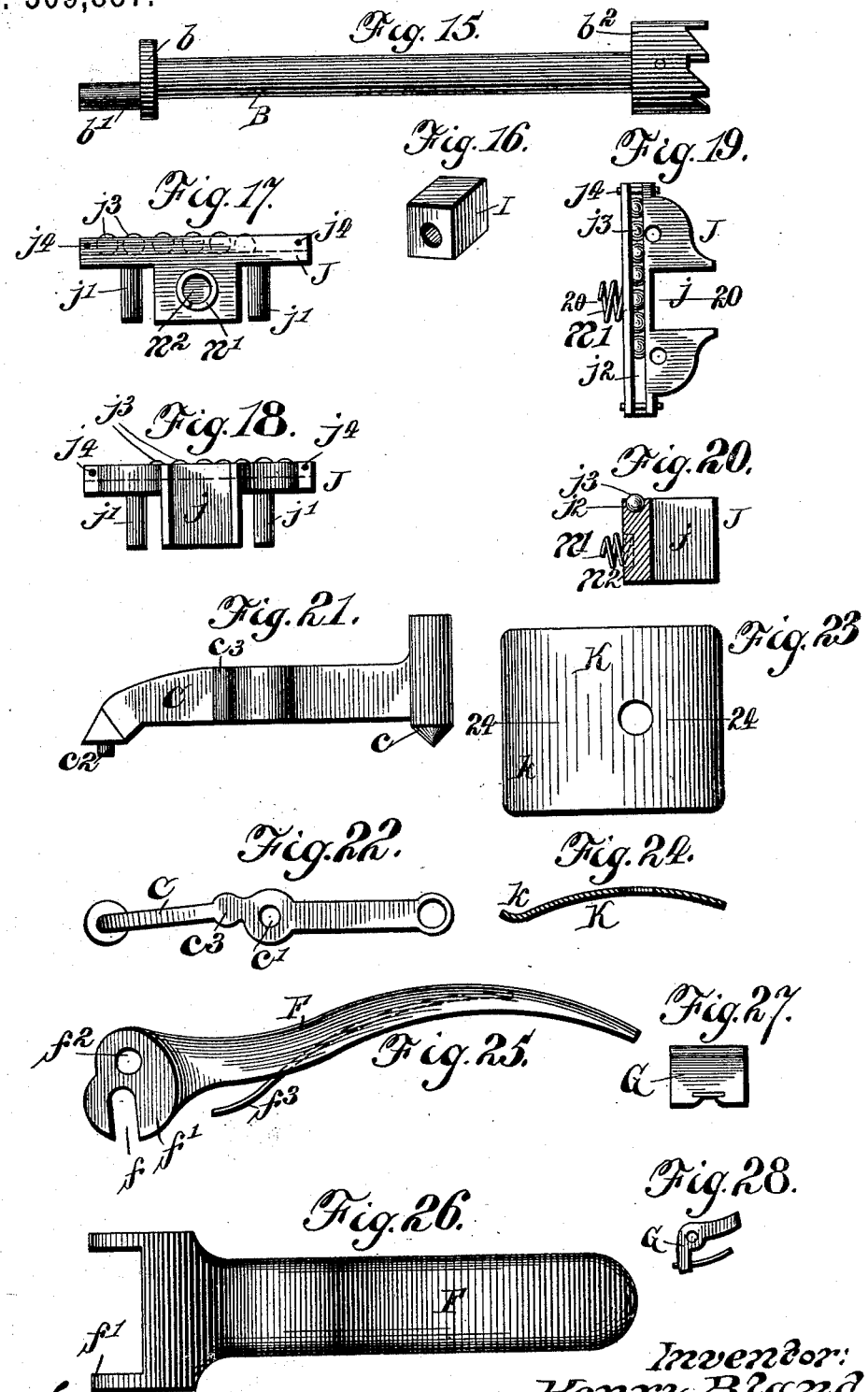

(No Model.) 5 Sheets—Sheet 5.

H. BLAND.
SHEEP SHEARING MACHINE.

No. 509,837. Patented Nov. 28, 1893.

Witnesses:
H. G. Dieterich
B. W. Sommers

Inventor:
Henry Bland
By Henry [illegible]
Atty

UNITED STATES PATENT OFFICE.

HENRY BLAND, OF LEICHARDT, NEAR SYDNEY, NEW SOUTH WALES.

SHEEP-SHEARING MACHINE.

SPECIFICATION forming part of Letters Patent No. 509,837, dated November 28, 1893.

Application filed March 23, 1893. Serial No. 467,395. (No model.)

*To all whom it may concern:*

Be it known that I, HENRY BLAND, engineer, a subject of the Queen of Great Britain, and a resident of Norton Street, Leichardt, near Sydney, in the British Colony of New South Wales, have invented an Improved Sheep-Shearing Machine, of which the following is a specification.

This invention relates to sheep shearing machines.

Its main object is to provide a sheep shearing machine which will give more satisfactory results with less expenditure of driving power than those hitherto constructed, and one, moreover, that will not be so liable to get out of order or be so readily worn out by sand or grit getting into the mechanism.

It consists in a sheep shearing machine constructed as hereinafter described, one of its features being that the cutter has an approximately rectilinear movement imparted to it through the medium of a pair of operating levers worked laterally by means of a square sleeve fitting loosely on a crank pin at the end of the driving spindle of the machine and acting through the medium of a connecting bridge piece. By this means I am enabled to maintain a more uniform cutting angle throughout the whole stroke of the machine, and at the same time provide a more accurate contact between the principal wearing surfaces.

Other features of my invention are: first, the means employed for shutting out sand or grit from the machine; second, the simple and convenient starting and stopping device for throwing the machine into or out of gear by the grasp of the shearer on the handle; third, the improved means for applying the tension to the cutter, and, fourth, the improved means for imparting the approximately rectilinear motion to the cutter.

Figure 5:
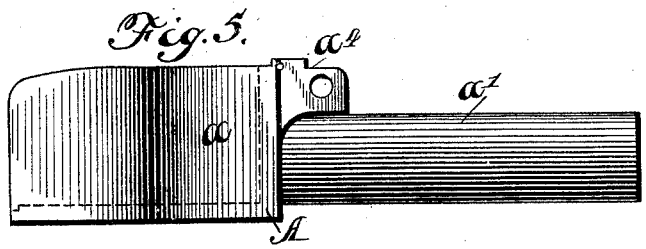
Figure 8:
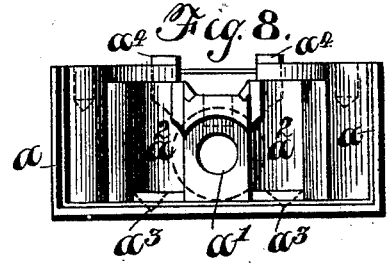
Figure 6:
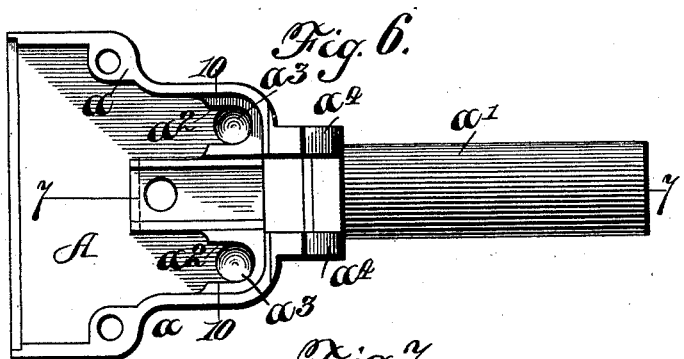
Figure 9:
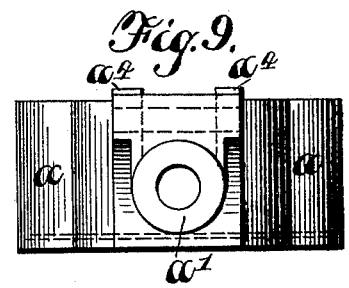
Figure 7:
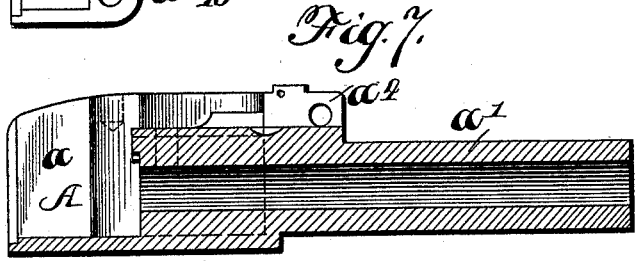
Figure 10:
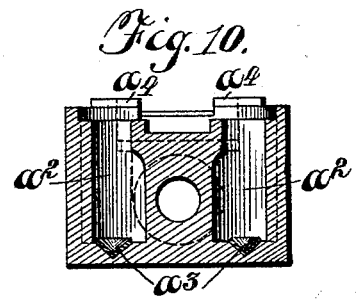
Figure 11:
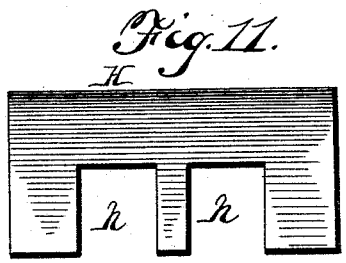
Figure 12:
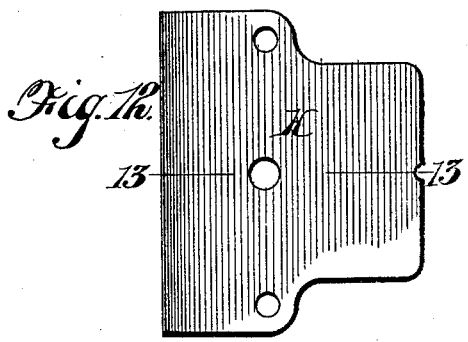
Figure 13:
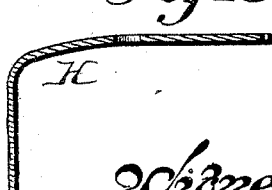
Figure 14:
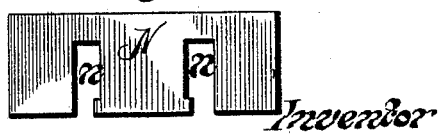
Figure 29:
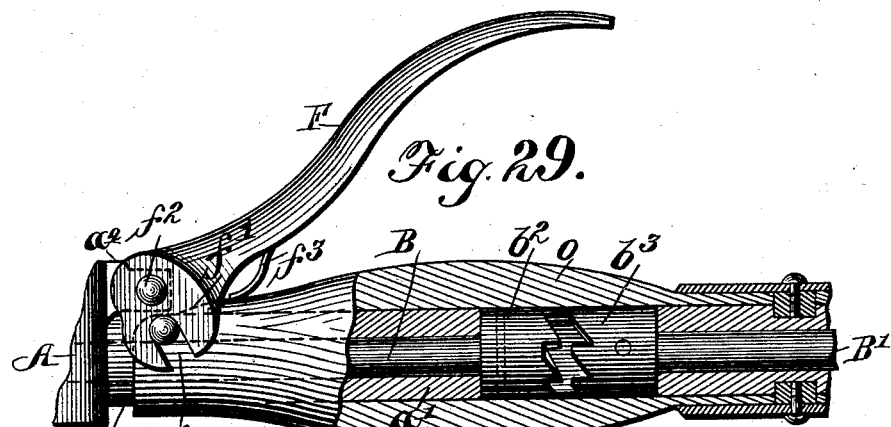
Figure 30:
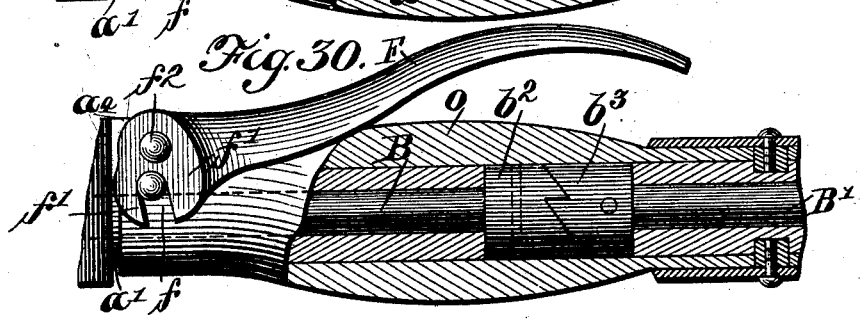
Figure 31:
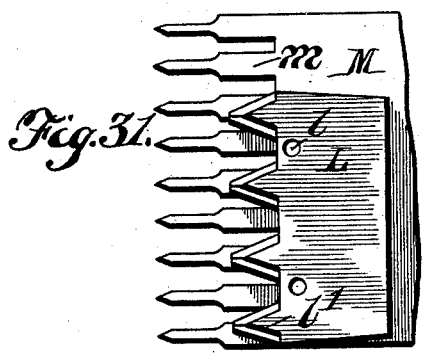

Referring to the accompanying drawings: Figure 1 is a side elevation and Fig. 2 a plan of my improved sheep shearing machine, with the tension gear and cover removed. Fig. 3 is a vertical central longitudinal section of the machine taken on line 3—3, Fig. 2. Fig. 4 is a vertical longitudinal section on line 4—4, Fig. 2. Fig. 5 is a side elevation and Fig. 6 a plan of the casing of said machine. Fig. 7 is a vertical central section on line 7—7, Fig. 6. Fig. 8 is a front end elevation and Fig. 9 a rear elevation of the casing. Fig. 10 is a vertical transverse section on line 10—10, Fig. 6. Fig. 11 is a front elevation and Fig. 12 a plan of the cover of my improved sheep shearing machine. Fig. 13 is a vertical central section on line 13—13, Fig. 12. Fig. 14 is a front elevation of the dust plate, or guard, which I arrange behind the front of the cover of the machine. Fig. 15 is a side elevation of the driving spindle of the machine. Fig. 16 is a perspective view of the square sleeve, or wearing block, in which the crank pin on the driving spindle works. Fig. 17 is a front elevation, Fig. 18 a rear elevation, and Fig. 19 a plan of the bridge piece. Fig. 20 is a vertical central section on line 20—20, Fig. 19. Fig. 21 is a side elevation and Fig. 22 a plan of one of the cutter levers. Fig. 23 is a plan of the tension spring used for pressing the cutter down upon its comb, and Fig. 24 is a section thereof on line 24—24, Fig. 23. Fig. 25 is a side elevation and Fig. 26 a plan of the lever used for throwing the machine in and out of gear, while Figs. 27 and 28 are respectively a front and side elevation of the stop piece for said lever. Figs. 29 and 30 are sectional elevations illustrating the way this lever is used for throwing the machine in and out of gear. Figs. 31 to 34 are diagrammatic plans illustrating the operation and construction of the comb and cutter of my machine.

The same letters of reference are used to indicate the same parts throughout the drawings.

A represents the casing of the machine, having sides, $a$, extending to the front edge and having a rearwardly projecting stem, $a'$, of sufficient length to form a good bearing for the central driving spindle, B. Two recesses, $a^2$, are formed in this casing, one on either side of the center, as illustrated in Figs. 2, 6 and 8; and the bottom of each of said recesses is fitted with a conical cup, $a^3$, to receive a corresponding conical pivot, $c$, on the rear end of each of the operating levers, C, which said ends extend upward, as shown in Figs. 2 and 4, and fit comparatively closely within the recesses, $a^2$, so as to effectually retain said levers in position.

Two upwardly projecting lugs, $a^4$, are formed on the casing, A, to support the forward end of the starting lever, F, and between these lugs is pivoted a stop piece, G, adapted to limit the movement of said lever. This stop piece is so arranged as that by its depression said lever is allowed to rise higher than its normal position, thus enabling the pins, o', to be drawn out of the slots, f, thereby allowing the forward part of the driving spindle, together with the shearing part of the machine, to be instantaneously separated from the handle and the hinder part of the spindle to which the driving gear is attached. This gives great facility for adjusting and repairing the machine proper.

H represents a cover which is fitted over the top and front of the sides of the casing, A, as shown in Figs. 1, 3 and 4, in order to inclose the moving parts of the machine as much as possible. It is formed with two openings, h (Fig. 11), in front of sufficient width to allow the cutter operating levers, C, to travel laterally for the requisite distance.

The driving spindle, B (Figs. 3 and 15), is provided at its forward end with a collar, b, from which projects a crank pin, b', while its rear end is fitted with one half, $b^2$, of a clutch, whose other half, $b^3$, is carried upon a short spindle, B', to which motion is imparted in any convenient manner. A square sleeve or wearing block, I (Figs. 2, 3 and 16), is fitted upon the crank pin, b', of the driving spindle, B, and is arranged to work up and down within a vertical channel, j, formed in the back of a bridge piece, J (Figs. 2 to 4 and 17 to 20), which is provided on each side with a downwardly projecting pin, j', fitting each into a hole, c' (Figs. 2 and 22), provided for the purpose at about the center of each of the operating levers, C. It is also formed with a groove or channel, $j^2$, extending from side to side along its upper surface and fitted with a number of balls, $j^3$, which are retained in position by small pins, $j^4$, at each end, as shown in Figs. 2, 3, 4, 17, 18 and 19.

K (Figs. 3, 4, 23 and 24) represents a tension spring, which is made comparatively broad, as illustrated in Fig. 23, and whose forward end is turned up slightly, as illustrated at k, while its rear end is arranged to rest upon the central part of the casing, A. The tension of this spring can be adjusted to any required extent by means of a screwed thumb nut, k', fitting over a correspondingly screw threaded stud, $k^2$, projecting up from the central part of the casing, A.

The front ends of the operating levers, C, are formed each with a downwardly projecting pin, $c^2$ (Figs. 1, 4 and 21), fitting into a hole c' (Figs. 31 to 34), formed in the cutter, L. These levers, C, are also each formed, as illustrated in Figs. 2, 21 and 22, with a circular boss, $c^3$, set in toward the center of the machine, and adapted to fit within openings, n (Fig. 14), formed in a dust-plate, N, which is fitted behind the front of the cover, H, and is pressed forward against said cover by a small spiral spring, n' (Figs. 2, 3, 17, 19 and 20), fitted within a recess, $n^2$, formed for the purpose in the front of the bridge-piece, J.

O represents a handle fitted over the stem, a', and clutch $b^2$, $b^3$, and arranged to slide to and fro thereupon. Its forward end is provided with two outwardly projecting pins, o' (Fig. 1), over which fit slots, f, cut in lugs f', on the forward end of the starting lever, F, which latter is fulcrumed upon a pin $f^2$, passing through the lugs, $a^4$, of the casing, A, and is provided with a flat spring, $f^3$, which always tends to keep it in its raised or out of gear position, as illustrated in Figs. 1, 3 and 29, that is in contact with the spring stop piece, G, which is also pivoted between the two lugs $a^4$.

Figure 32:
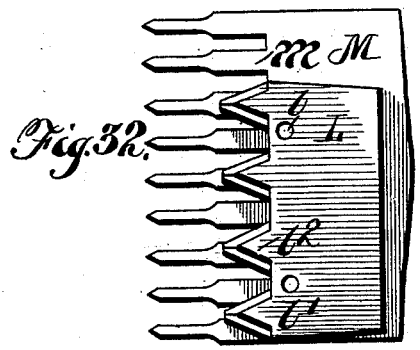
Figure 33:
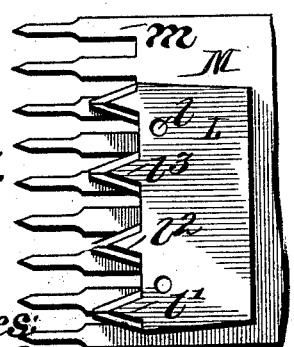
Figure 34:
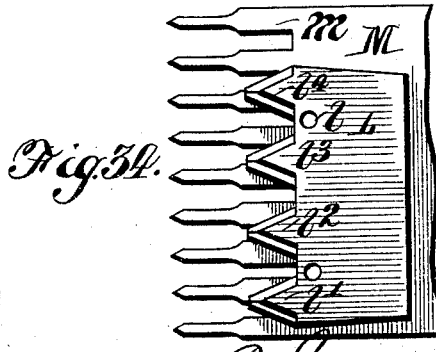

According to my invention I make the reciprocating cutter, L, with differential teeth; that is, I arrange said teeth so that they commence to cut one after the other. This will be understood on reference to Figs. 31 to 34, where one tooth, l', is shown as just commencing its cut in the first-mentioned figure. By the time it is about half way through its cut, the second tooth, $l^2$, will commence to operate as illustrated in Fig. 32, and by the time this second tooth is half way through its cut, and the first tooth quite through, the third tooth, l, will commence to cut as illustrated in Fig. 33; and similarly by the time the second tooth has completed its cut, and the third tooth is half way through, the fourth tooth, $l^4$, will be commencing to operate as illustrated in Fig. 34. By these means the cut, instead of taking place at two points only in the revolution, will be distributed over a greater number of points.

Partly by the rectilinear movement imparted to the cutter, L, by the arrangement of levers which I employ, and partly by reason of the shape of the butt end of the slots between the teeth of my comb, I am enabled to considerably reduce the cutting angle between the cutting edge of the teeth of the cutter and the cutting edge of the teeth of the comb, and thus obtain a more efficient result with less tendency to push the wool out of the comb. The comb, M, at those portions, m, of its teeth over which the cutter, L, works, is formed with parallel sides, the space between the teeth at that part being approximately equal to their width. In front of this part the teeth are made to taper slightly up to their points, so as to insure an easy ingathering of the wool.

Having now particularly described and ascertained the nature of my said invention and in what manner the same is to be performed, I declare that what I claim is—

1. In a sheep shearing machine the combination with the cutter operating and driving spindles both provided with a clutch face at their proximate ends, of a handle concentric with and having motion longitudinally of said cutter operating spindle, and a connection between said handle and the driving spindle for the purpose of engaging or disengaging the clutch faces of said spindles.

2. In a sheep shearing machine the combination with the cutter operating and driving spindles provided with a clutch face at their proximate ends, of a handle concentric with and having motion longitudinally of said cutter operating spindle, a connection between said handle and driving spindle, and a lever adapted when depressed to move the handle in one direction and thereby move the clutch face of said driving spindle into engagement with that of the cutter operating spindle.

3. In a sheep shearing machine the combination with the cutter operating and driving spindles provided with a clutch face at their proximate ends, of a handle concentric with and having motion longitudinally of said cutter operating spindle, a connection between the handle and driving spindle, a lever adapted when depressed to move the handle in one direction and thereby move the clutch face of said driving spindle into engagement with that of the cutter operating spindle, and means for automatically moving the lever when released and therethrough the handle in a reverse direction, for the purpose set forth.

4. In a sheep shearing machine the combination with the casing and the cutter operating and driving spindles provided with a clutch face at their proximate ends, a handle concentric with and having motion longitudinally of said cutter operating spindle, said handle provided with laterally projecting pins, and a connection between the handle and the driving spindle; of a spring actuated lever fulcrumed on the casing and provided with slotted lugs engaging the pins on the handle, and a stop adapted to limit the movement of said handle under the stress of its spring.

5. In a sheep shearing machine, the combination with the casing and the cutter operating and driving spindles provided with a clutch face at their proximate ends, said cutter operating spindle revoluble in a bearing on the casing, a handle loosely fitted on said bearing and provided with laterally projecting pins and a connection between the handle and driving spindle; of a spring actuated lever fulcrumed on the casing and provided with slotted lugs adapted to engage the pins on the handle, said slots formed at an angle less than a right angle to the axis of said pins, and a movable stop adapted to limit the motion of the lever under the stress of its spring, for the purpose set forth.

6. In a sheep shearing machine, the combination with the comb, the cutter and two levers connected with said cutter, of means for vibrating the levers comprising a bridge piece or cross head connected with said levers and provided with a vertical channel, a revoluble spindle provided with a crank, and a rectangular block on said crank working in the channel of the bridge piece.

7. In a sheep shearing machine, the combination with the comb, the cutter, and two levers connected with said cutter and provided with openings $c'$, of a bridge piece or cross head provided with pins $j'$ extending into openings $c'$, said bridge piece provided with a vertical channel, a revoluble spindle provided with a crank, and a rectangular block on said crank, working in the channel of the bridge piece.

8. In a sheep shearing machine, the combination with the comb, the cutter, two levers connected with said cutter, a bridge piece or cross head also connected with the levers and means for reciprocating the bridge piece, of a tension spring exerting pressure on said bridge piece, and rolling bearings interposed between the spring and bridge piece for the purpose set forth.

9. In a sheap shearing machine, the combination with the comb, the cutter, two levers connected with said cutter, a bridge piece or cross head also connected with the levers and means for reciprocating the bridge piece, of an adjustable tension spring and rolling bearings interposed between the spring and bridge piece, for the purpose set forth.

10. In a sheep shearing machine, the combination with the casing open at top and provided with cone bearings in its bottom, the comb secured to the latter, the cutter on said comb, two levers having vertical cone pivots stepped in the aforesaid cone bearings, said levers detachably connected with the cutter and provided with openings $c'$, a bridge piece or cross head provided with pins extending into said openings $c'$, said bridge piece provided with a vertical channel for the driving element, of the cover H for the casing by means of which the aforesaid movable parts are held in their operative positions.

11. The combination with the casing, the cutter, the cutter operating levers, the bridge piece J and the cover H for the casing, of a dust guard plate interposed between said bridge piece and the front wall of said cover, for the purpose set forth.

12. The combination with the casing, the cutter, the cutter operating levers, the bridge piece J and the cover H for the casing, of the dust guard-plate N straddling the cutter operating levers and having motion therewith, said guard-plate interposed between the bridge piece and vertical wall of the cover H, for the purpose set forth.

13. The combination with the casing, the cutter, the cutter operating levers, the bridge piece J and the cover H for the casing, of the dust guard-plate N straddling the cutter operating levers and having motion therewith, said guard-plate interposed between the bridge piece and vertical wall of the cover H, and a spring operating to hold said guard-plate in frictional contact with said vertical wall of the cover, for the purpose set forth.

In witness whereof I have set my hand in presence of two witnesses.

HENRY BLAND.

Witnesses:
 EDWARD WATERS,
 WALTER SMYTHE BAYSTON.